United States Patent [19]

Modell

[11] 4,338,199
[45] Jul. 6, 1982

[54] PROCESSING METHODS FOR THE OXIDATION OF ORGANICS IN SUPERCRITICAL WATER

[75] Inventor: Michael Modell, Cambridge, Mass.

[73] Assignee: Modar, Inc., Natick, Mass.

[21] Appl. No.: 147,946

[22] Filed: May 8, 1980

[51] Int. Cl.$^3$ ................................................ C02F 1/72
[52] U.S. Cl. .................................... 210/721; 210/761
[58] Field of Search ............... 210/761, 762, 721, 722, 210/774, 766; 48/209, 202, 210

[56] References Cited

U.S. PATENT DOCUMENTS

| | | | |
|---|---|---|---|
| 3,207,572 | 9/1965 | Saul | 210/761 X |
| 3,876,497 | 4/1975 | Hoffman | 210/761 X |
| 3,920,506 | 11/1975 | Morgan | 210/761 X |
| 4,000,068 | 12/1976 | Nelson et al. | 210/762 X |
| 4,013,560 | 3/1977 | Pradt | 210/761 X |
| 4,141,829 | 2/1979 | Thiel et al. | 210/762 |

OTHER PUBLICATIONS

Wightman, "Studies in Supercritical Wet Air Oxidation", Master's Thesis, University of California, Berkeley, Mar. 1981.

Primary Examiner—Thomas G. Wyse

[57] ABSTRACT

Organic materials are oxidized in supercritical water to obtain useful energy and/or resultant materials. In one embodiment, conventional fuels are oxidized with high efficiency to obtain useful energy for power generation and/or process heat. In another embodiment toxic or waste materials are converted to useful energy for power and heat and/or to non-toxic resultant materials. The method is also useful to permit use of a wide range of organic materials as a fuel in the desalination of seawater and brine or the removal of certain inorganic salts from water.

29 Claims, 5 Drawing Figures

THE EFFECT OF FUEL HEATING VALUE ON OXIDIZER OUTLET TEMPERATURE AND RECYCLE RATIO. (FUEL CONC: 10 lb. CH / 100 lb. H$_2$O; OPERATING PRESSURE: 3,600 p.s.i.a.; NO HEAT EXCHANGER; OXIDIZER INLET TEMPERATURE: 377°C.)

Fig. 3

THE EFFECT OF FEED CONCENTRATION ON OXIDIZER OUTLET TEMPERATURE AND RECYCLE RATIO. (FUEL HEATING VALUE: 12000 b.t.u./lb. CH; OXIDANT: PURE OXYGEN; OPERATING PRESSURE: 3600 p.s.i.a.)

Fig. 4

PROCESSING METHODS FOR THE OXIDATION OF ORGANICS IN SUPERCRITICAL WATER

BACKGROUND OF THE INVENTION

The oxidation of organic materials to carbon dioxide and water is a process known almost since the beginning of time and often used to dispose of waste materials and/or generate useful energy such as steam for heating, power generation and in some cases, for desalination of seawater. In conventional generation of energy in the form of steam often organic fuels are oxidized rapidly in combustion to produce heat which is then transferred through a heat exchanger to a fluid such as water. There are inherent losses in this conventional system. For example often 10 to 15% of the heating value of the fuel is necessarily lost in the exhaust stack of conventional boilers. In addition, the heat exchangers necessarily add to cost and expense and are often of relatively large size. Heat transfer through surfaces of heat exchangers sometimes causes problems and often requires the use of specialized materials when high temperatures are involved. Hot spots due to salt deposition on boiler tubes can cause expensive down-time due to rupture of tube walls. On the flame or hot gas sides of the tubes, ash or other deposits often impede heat flow and reduce heat transfer efficiency.

In one known process for treating waste organic materials, i.e. the wet air oxidation process, an organic feed and oxidizing agent are pressurized to reaction conditions of from about 1500 to 2500 psia, heated to operating temperature and fed to a reactor for residence times of 0.5 to 1 hour. This process is known to be effective for removing 70–95% of the initial organic material. This system is effective but has certain disadvantages. It is often costly in that large size equipment is necessary and inefficient recovery of the heat of combustion is obtained. Often the solubility of oxygen or air in water is below the level required for complete oxidation of the organic materials. Thus, a two-phase water-gas mixture is often used in the reactor, necessitating provisions for agitation in the reactor so as to avoid excessive mass transfer resistance between the phases. This tends to make the reactor somewhat complicated and more expensive than would otherwise be necessary. Often volatile organics such as acetic acid remain after complete processing. Long residence times are needed and the reactions are often not adiabatic which results in loss of part of the heat of combustion to the environment. When energy is recovered in the form of steam, the temperature of the steam produced is below that of the reactor effluent, which is usually below 300° C. and typically in the range of 250° C. Thus, the heat recovered is of a low to moderate value and significantly below that required for generating electrical power in modern steam cycle power plants.

It has been suggested to recover heat energy from supercritical water effluent and the technology for doing this is highly developed. Electrical utilities since the 50's have used supercritical water power cycles to generate power from fossil fuels.

The known literature describes production of supercritical water by burning fossil fuels followed by the use of equipment for recovering heat from the supercritical water and turning the heat into power. Thus, such recovery systems are known. Rankine cycle type equipment can be used to recover useful energy from water at supercritical conditions and temperatures above 450° C. as known in the art.

It has been suggested that toxic organic materials can be reformed at the supercritical conditions of water to harmless lower molecular weight materials by breakdown of organic chains and the like whereby the resulting non-toxic materials can be disposed of by conventional means.

SUMMARY OF THE INVENTION

It is an object of this invention to provide a method of oxidizing organic materials to obtain useful energy and/or detoxify or destroy noxious and toxic organic materials and/or remove unwanted salts from water.

It is another object of this invention to provide a method in accordance with the preceding object which enables oxidizing of conventional and unconventional organic fuels efficiently with maximized energy recovery in simplified apparatus for use in a wide variety of heating and power cycles.

It is still another object of this invention to provide means and methods for rendering harmless and/or easily disposable, waste and/or toxic organic materials where the energy of oxidation thereof can be harnessed to carry out the processing and in some cases useful excess energy is produced.

It is still another object to provide a method in accordance with the preceding objects which can be used to desalinate seawater and brine using the energy of the organic material and in some cases while obtaining additional useful energy and/or treating waste or toxic materials.

It is still another object of this invention to provide methods in accordance with the preceding methods which can be carried out in simplified equipment at high reaction rates.

It is still another object of this invention to provide apparatus for carrying out the methods of this invention.

According to the invention organic materials are oxidized in an oxidizer by forming a reaction mixture of the organic materials, water and oxygen with the reaction mixture preferably at supercritical conditions. The mixture is reacted in a single fluid phase in a well-insulated reactor to cause the organic material to be oxidized whereby the effluent stream picks up the heat generated. The organic material can be waste and/or toxic material which are merely oxidized and destroyed in the method. The organic material can be a waste, toxic material or other organic material useful as a fuel and is oxidized to recover useful energy for heating or to obtain a mixture of supercritical water and carbon dioxide suitable for use as process water in power cycles.

In another preferred method, the organic material can be any organic material having sufficient heat value to raise the temperature in an oxidizer at supercritical conditions to a value of at least 450° C. The water contains a salt such as sodium chloride when the water is seawater or brine and the salt precipitates out of the single fluid phase solution immediately after reaction, as in conventional precipitating equipment, to enable desalting of the water in a rapid and continuous process.

Preferably a part of the heated water obtained which is preferably at supercritical conditions is mixed directly with the reactants which enter the oxidizer to quickly bring the reaction mixture to the desired temperature for starting the oxidation. The heated water obtained can also be used to provide heat to the reaction mixture through a heat exchange wall surface. Direct mixing is preferred since it enables reaching the desired hot temperatures rapidly, i.e. substantially instantaneously and thus avoids char formation in certain embodiments.

Preferably the organic material is used in an amount of from 2 to 25% by weight of the water at a temperature of 374° C. or above and a pressure of at least 3200 psia. Oxygen is used in the form of pure oxygen, air or other gaseous mixture but in an amount preferably equal to or greater than the stoichiometric amount required for full oxidation of the organic material. The vessel used as an oxidizer is preferably well insulated and of sufficient length to provide sufficient time for essentially complete oxidation of the organics which is preferably designed to occur in about five minutes or less.

It is a feature of this invention that substantially complete oxidation of organics using supercritical water can be carried out at high speed in relatively uncomplicated equipment. At supercritical water conditions, oxygen and nitrogen should be completely miscible with water in all proportions [see, e.g., H. A. Pray, et al., *Ind. Eng. Chem.*, 44 (5), 1146–51 (1952).]. Thus two-phase flow of gases and water are eliminated and single fluid phase flow results which allows simplification of the reactor construction often without the need for mechanical mixing. When the feed is at 374° C. prior to the onset of oxidation, the heat released by oxidation elevates the temperature of the water-organic-oxygen stream appreciably and it can easily reach 450°–700° C. If the mean temperature in the oxidizer is 400° C. or above then the residence time in the oxidizer can be less than 5 minutes. Since the oxidation occurs within a water phase, dirty fuels can be used without the need for off gas scrubbing. For example sulfur in the fuels can be oxidized to solid sulfate which would be readily recovered from the effluent stream from the oxidizer. It is part of the invention to precipitate inorganics in the feed as from a waste slurry, since the solubility of inorganic salts in supercritical water drops to very low levels as for example 1 ppb to 100 ppm above 450° C. to 500° C. The effluent from the oxidizer can easily be designed to be above 450°–500° C. thus causing inorganics in the stream to precipitate and be readily removed as by cyclones, settling columns or filters. Thus the water output from the system is purified of inorganic salts. In addition, the feed water need not be purified prior to use allowing the use of brine or seawater without prior treatment. Thus the system is ideal for shipboard use where power and/or desalted water can be obtained, sometimes simultaneously. The heat of oxidation of the organics in the feed is recovered directly in the form of high temperature, high pressure water, that is, superheated supercritical water or steam without the need for heat transfer surfaces.

BRIEF DESCRIPTION OF THE DRAWINGS

The above and other objects, features and advantages of the present invention will be better understood from a reading of the following specification in conjunction with the attached drawings in which.

BRIEF DESCRIPTION OF PREFERRED EMBODIMENTS

Figure 1:
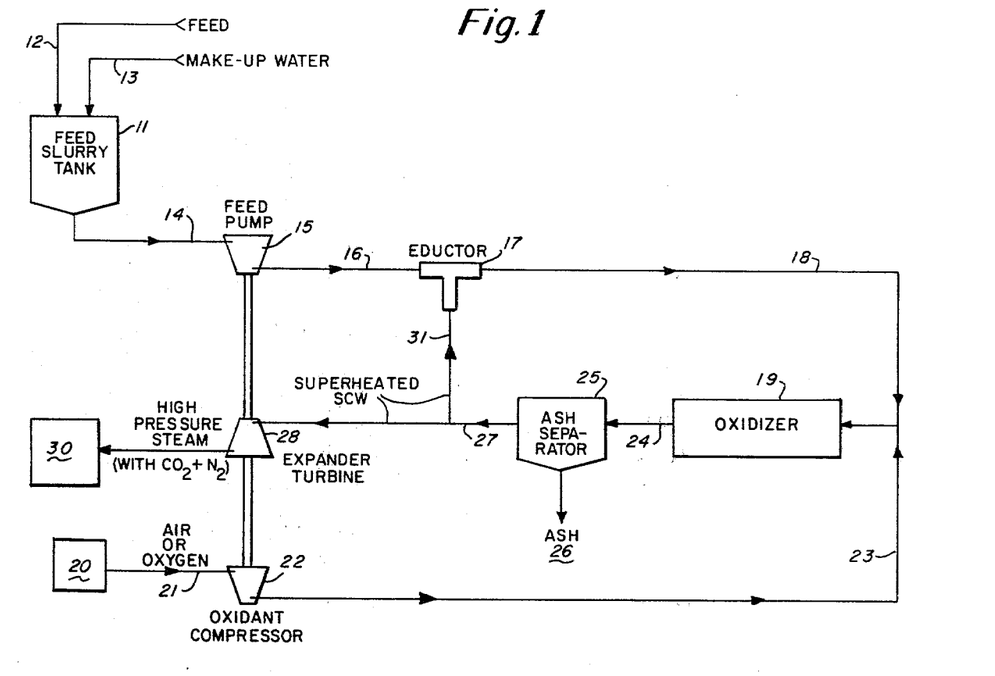
FIG. 1 is a schematic diagram of an apparatus useful for carrying out the process of the present invention.

With reference now to FIG. 1 of the drawing, a schematic diagram of an apparatus for carrying out the method of this invention is shown. The organic material feed is added to feed slurry tank 11 through line 12 along with makeup water passed through line 13.

From the slurry tank, the water and organic materials are passed through line 14, feed pump 15, line 16 to an eductor 17 and line 18 into an oxidizer 19. Air or oxygen from a source 20 passes through line 21 and an oxidant compressor 22 through line 23 either directly to the oxidizer or to line 18 intermixing with the organic material and makeup water to form a reaction mixture entering the oxidizer. After the reaction in the oxidizer, an effluent stream from the oxidizer passes through line 24 to a conventional ash separator 25 where ash and inorganic salts can be removed at the bottom 26 as known in the art with the effluent stream passing through line 27 to an expander turbine 28 and out as useful energy in the form of high pressure steam or water in output 30. A portion of the effluent stream containing carbon dioxide, nitrogen if air is used as the oxidant and supercritical water at superheated temperature, that is, above the critical temperature of water 374° C. can be recycled and passed through line 31 and the eductor 17 to give the required degree of heat to the entering reaction mixture at the oxidizer.

The organic material useful as the feed of the present invention can be substantially any organic materials including fuels and waste shown on Table I below:

TABLE I

| Fuel Material | Ultimate Analysis (dry wt basis) | | | | | | Btu/ lb | Btu/ lb CH |
|---|---|---|---|---|---|---|---|---|
| | C | H | O | N | S | Ash | | |
| Utah coal | 77.9 | 6.0 | 9.9 | 1.5 | 0.6 | 4.1 | 14,170 | 16,889 |
| Pittsburgh coal #1 | 75.5 | 5.0 | 4.9 | 1.2 | 3.1 | 10.3 | 13,650 | 16,957 |
| Pittsburgh coal #2 | 73.3 | 5.3 | 10.2 | 0.7 | 2.8 | 7.6 | 13,097 | 16,663 |
| Wyoming coal | 70.0 | 4.3 | 20.2 | 0.7 | 1.0 | 13.8 | 14,410 | 19,394 |
| Douglas fir bark | 56.2 | 5.9 | 36.7 | 0.0 | 0.0 | 1.2 | 9,500 | 15,298 |
| Wood | 52.0 | 6.3 | 40.5 | 0.1 | 0.0 | 1.0 | 9,000 | 15,437 |
| Pine bark | 52.3 | 5.8 | 38.8 | 0.2 | 0.0 | 2.9 | 8,780 | 15,112 |
| Bagasse | 47.3 | 6.1 | 35.3 | 0.0 | 0.0 | 11.3 | 9,140 | 17,116 |
| Raw Sewage | 45.5 | 6.8 | 25.8 | 2.4 | 0.5 | 19.0 | 7,080 | 13,537 |
| Bovine waste | 42.7 | 5.5 | 31.3 | 2.4 | 0.3 | 17.8 | 7,380 | 15,311 |
| Rice hulls | 38.5 | 5.7 | 39.8 | 0.5 | 0.0 | 15.5 | 6,610 | 14,955 |
| Rice straw | 39.2 | 5.1 | 35.8 | 0.6 | 0.1 | 19.2 | 6,540 | 14,763 |

TABLE I-continued

| Fuel Material | Ultimate Analysis (dry wt basis) | | | | | | Btu/ lb | Btu/ lb CH |
|---|---|---|---|---|---|---|---|---|
| | C | H | O | N | S | Ash | | |
| MSW | 33.9 | 4.6 | 22.4 | 0.7 | 0.4 | 38.0 | 5,645 | 14,662 |
| Paper mill sludge | 30.9 | 7.2 | 51.2 | 0.5 | 0.2 | 10.2 | 5,350 | 14,042 |
| Sewage sludge | 14.2 | 2.1 | 10.5 | 1.1 | 0.7 | 71.4 | 2,040 | 12,515 |
| Lignite (N.D.) | 42.4 | 6.7 | 43.3 | 1.7 | 0.7 | | 7,210 | 14,684 |
| Subbituminous B | 54.6 | 6.4 | 33.8 | 1.0 | 0.4 | | 9,420 | 15,443 |
| Ethyl alcohol | 52.2 | 13.0 | 34.8 | — | — | — | 12,780 | 19,601 |
| Carbon | 100.0 | | | | | | 14,093 | 14,073 |
| Methane | 75.0 | 25.0 | — | — | — | — | 21,520 | 21,520 |
| Propane | 81.8 | 18.2 | — | — | — | — | 19,944 | 19,944 |
| Hexane | 83.7 | 16.3 | — | — | — | — | 19,403 | 19,403 |
| Benzene | 92.3 | 7.7 | | | | | 17,480 | 17,480 |
| No.1 fuel oil | | | | | | | | 19,665 |
| No.2 fuel oil | | | | | | | | 19,408 |
| No.4 fuel oil | | | | | | | | 19,213 |
| No.5 fuel oil | | | | | | | | 19,015 |
| No.6 fuel oil | without limitation | | | | | | | 18,794 |

Organic material feeds include without limitation known toxic and waste materials such as:

Aldrin
Dieldrin
DDT
2,4,5-T and esters
2,4-diaminotoluene
Lindane
p-aminobenzoic acid
anthranilic acid
Alfatoxin
Heptachlor
Malathion
Nitrosamines
commuted paper waste
landfill garbage and the like.

Organic toxic material to be treated in this invention include those recognized as hazardous by the United States Environmental Protection Agency as for example those set out in EPA publication EPA-560/1179-001 entitled Test Data Development Standards: Chronic Health Effects Toxic Substances Control Act; Section 4. When toxic and waste materials are used, it sometimes is only desired to utilize the heat of oxidation to aid in oxidizing of these materials to harmless products which can be taken off the oxidizer and discarded. The resultant supercritical water can be passed to other areas without removing the energy therefrom for use in power cycles. When moderate to high heating value input materials are used, useful energy is obtained which can be converted to power using steam turbines, Rankine/cycle systems and the like as known in the art. The heated water output can be used directly in heat exchangers for space heating or any heating purpose. Preferably the concentration of the organic materials is in the 2-25% by weight range of the reaction mixture. The partial list of possible feed materials in Table I shows that the heating value in BTU per pound of fuel varies over a broad range from 2,040 BTU/lb. for sewerage sludge to 21,520 BUT/lb. for methane. The last column in Table I is the heating value in BTU per pound of carbon and hydrogen in the fuel. On this basis, the heating values vary over a much smaller range: 12,500 BTU/lb. CH for sewerage sludge and 15,000 BTU/lb. CH for wood and bark, 16-19,000 BTU/lb. CH for coals and 18-20,000 BTU/lb. CH for fuel oils.

Figure 2:
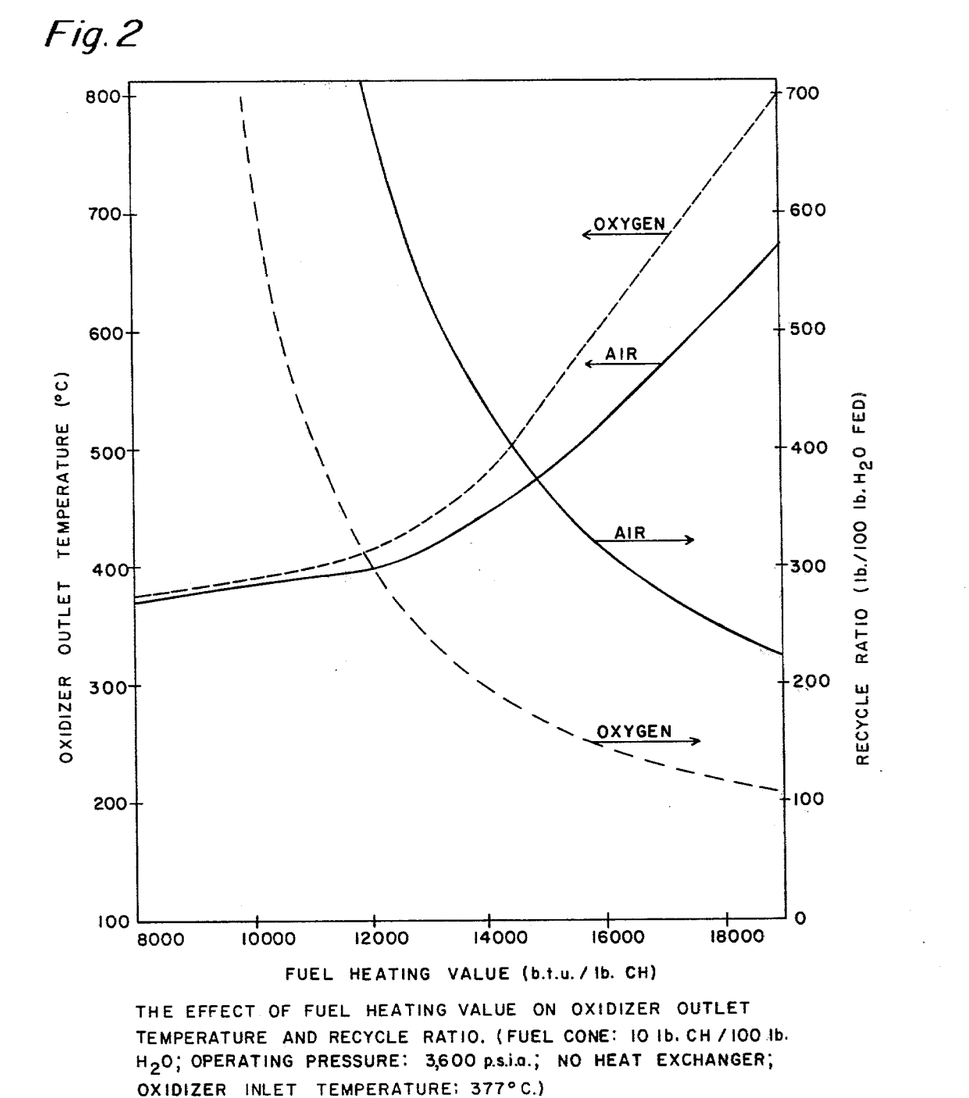
FIG. 2 is a diagrammatic showing of the effect of fuel heating value on oxidizer outlet temperature and recycle ratio.

The heating value of the fuel defines the feed concentration and recycle ratio required to reach a given oxidizer outlet temperature. At a given fuel feed concentration the outlet temperature varies with the fuel heating value. The effect of fuel heating value on oxidizer outlet temperature and recycle ratio is shown in FIG. 2. The results of FIG. 2 were determined by the thermodynamic first law energy balance assuming negligible energy losses to the environment (Fuel conc: 10 lb. CH/100 lb. $H_2O$; operating pressure: 3,600 psia; no heat exchanger; oxidizer inlet temperature 377° C.). With air as oxidant, the oxidizer outlet temperature varies from 441° C. at 14,000 BTU/lb. CH to 563° C. at 19,000 BTU/lb. CH. If oxygen is used instead of air, the outlet temperature is somewhat higher as shown by the dash line in FIG. 2. The recycle ratio is determined by the oxidizer outlet temperature and the desired oxidizer inlet temperature. For an oxidizer inlet temperature of 377° C. the relationship between recycle ratio and fuel heating value is shown in FIG. 2 for air (solid curve) and oxygen (dash curve). Higher recycle ratios are required when air is used instead of oxygen because the inert nitrogen component of air decreases the oxidizer outlet temperature.

Basically higher temperatures are preferred at the outlet of the oxidizer so that a smaller proportion of water need be recycled to provide heat for the reaction. The outlet temperature will preferably always be above 374° C. when single phase reactions occur and preferably it is above 450° C. to maximize salt precipitation and to minimize the recycle. Thus with low heating value fuels, higher feed concentration reaction mixtures are used. In some cases, supplemental system heat exchangers are used along with the recycle to achieve the desired temperature at the inlet to the oxidizer.

The reaction often preferably is carried out at the near critical density of water which means that the temperature must be at least the critical temperature and the pressure at least the critical pressure of water. Parameters at the near critical condition of water can also be used and should be considered the equivalent of exact critical condition. The near critical region or the term "in the region of the critical density of water" is encompassed by densities of from 0.2 to 0.7 grams per centimeter$^3$. In this near critical region or in the region of the critical density, pressures can be from 200 to 2500 atmospheres and temperatures can be from 360° C. to at least 450° C. A critical temperature range of 374° C. to 450° C. and a critical density range of 0.25 to 0.55 grams per centimeter$^3$ are preferred for use.

Figure 4:
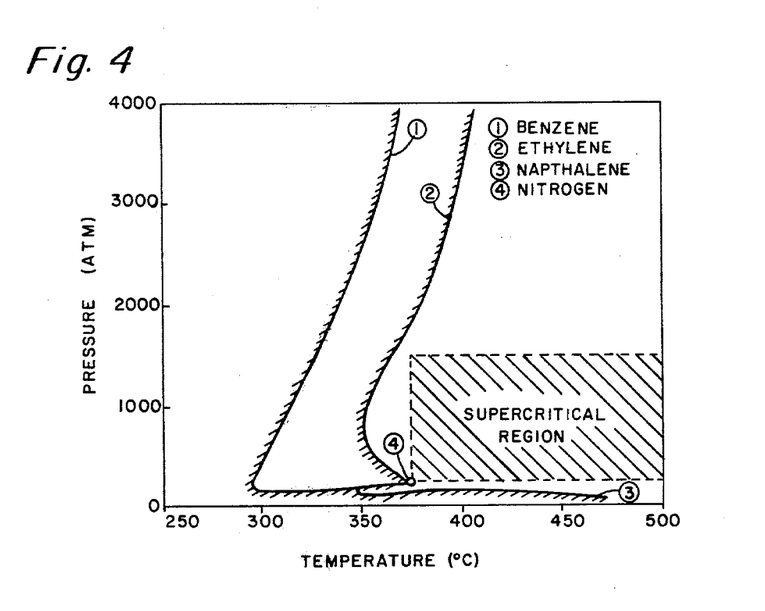
FIG. 4 is a diagrammatic showing of the critical locii of water mixtures.

Although it is preferred to have the effluent stream from the oxidizer reach a temperature and pressure condition at the near critical condition of water this can vary in some cases. In all cases the reaction in the reaction vessel or oxidizer at some point reaches supercritical conditions, i.e. temperature and pressure conditions are such that only a single homogeneous fluid phase can exist in the mixture of reactants. FIG. 4 is a graph of pressure versus temperature showing the supercritical region, i.e., the locus of critical points for binary mixtures of water with benzene, ethylene, naphthalene and nitrogen. In all cases with the mixture used for the reactants supercritical conditions are to the right and above the locus graphed. Since oxygen water mixtures have a locus similar to the nitrogen water mixture, it will be understood that temperatures and pressures to the right of line (4) should be obtained in the oxidizer. These conditions are close to the supercritical conditions of water alone. These supercritical conditions must occur in the oxidizer to get the single fluid phase reaction to permit full and rapid oxidation. In FIG. 4 the concentration of the organic in admixture with water increases as the lines go out from the water point at the lower right-hand corner of the water supercritical region shown on the graph.

The temperature and pressure going into the oxidizer can vary. The kindling temperature of the reaction mixture must be reached prior to entrance and supercritical conditions for the reaction mixture must occur at some point in the oxidizer due to the heat released in the adiabatic oxidation of a portion of the organic feed.

The initial temperature going into the oxidizer for materials that tend to char, i.e., pyrolyze or decompose, is preferably above the char formation temperature range. For example cellulosic materials tend to pyrolyze in the range of 150° C. to 325° C., so they are rapidly brought to 374° C. before the oxidizer by recycling supercritical water from the oxidizer effluent, directly therewith thus raising the temperature of the reaction mixture substantially instantaneously and minimizing char formation. On the other hand, many liquid hydrocarbon fuels do not substantially pyrolyze below 374° C. and thus can be passed in a water, oxygen reaction mixture to the oxidizer at lower temperatures as for example at least 200° C. at 220 atmospheres. Similarly many toxic materials and wastes which are liquid or solids can enter the oxidizer under the same conditions as liquid hydrocarbon fuels. Cellulosic materials preferably enter the oxidizer at at least 350° C. and 220 atmospheres. The recycle of water from the oxidizer is used to raise the reaction mixture temperature with the amount of recycle determined by the oxidizer entrance temperature desired.

All heating is preferably obtained by recycling through line 31 using the heated water and preferably supercritical water obtained from the oxidizer. The process is continuous after startup and initial heat can be obtained from an outside source for startup.

The organics in the feed can be converted to combustible compounds such as furans, furfurals, alcohols and aldehydes by the use of a reformer in line 18 if desired so that the feed passes therethrough before mixture with air or oxygen and passage to the oxidizer. The use of a reformer to gasify organic materials under supercritical conditions is known in the art and described in U.S. Pat. No. 4,113,446 issued Sept. 12, 1978 relating to gasification processes using supercritical water. Reformers as described therein can be used in the present system if desired although in most cases, they are unnecessary.

The feed material can be in liquid form as with liquid organics, aqueous slurry form, gaseous form or solid form. When in solid form, the feed is preferably comminuted for convenience for incorporation into the feed water as a pumpable slurry.

It is a feature of this invention that inorganic materials such as salts which are highly soluble in water often lose solubility and become substantially insoluble at temperatures above 450° C. Thus, when seawater, brine or other impure waters are used as makeup water, the organic materials can provide the fuel for desalting. Thus when the exit temperature from the oxidizer is above 450° C., conventional ash separators can be used to allow precipitation of sodium chloride, calcium chloride, ferric oxide and the like. These materials often cause problems in conventional apparatus where heat transfer is through walls of the apparatus. They tend to build up on the walls causing hot spots with subsequent destruction of the walls. In the present method, the oxidizer is a flow through oxidizer and can be for example a stainless steel tube covered by layers of insulation such as Min-K. When temperatures in excess of 450° C. are generated within the oxidizer or when high concentrations of chloride are present, the inner wall of the reactor may be clad with corrosion-resistant alloys such as Hastelloy C. When large diameter reactors are employed, the inner wall may be lined with firebrick. When high concentrations of inorganic constituents are present or when solid catalysts are used to reduce the residence time required for oxidation, a fluidized bed reactor can be used to provide efficient separation of fluid effluent from solids.

The superheated supercritical water in line 27 is passed for recycling to provide the heat necessary at the starting point in the oxidizer or through the expander turbine to form the high pressure steam useful in a conventional power cycle such as 30. Diagrammatic box 30 represents a heat user component. This can be a heat exchanger where the process heat generated is used for space heating or for obtaining useful energy in any known conversion apparatus.

The oxidizer allows single phase reaction which is extremely important to minimize the cost, expense and complexity of the oxidizer itself and maximize rapid reaction in time periods of less than one to 5 min.

The supercritical water process of this invention for generating high pressure steam has several advantages over conventional processes that are used for the same purpose. The feed organic material even if wet forest products, can be used directly without drying because water is used as the carrier fluid for both oxidation and reforming when reforming is first carried out. Oxidation takes place rapidly and yet under safe, controlled conditions. Auxillary equipment for pollution control is not necessary because the oxidation products are maintained within a close continuous system. Supercritical steam can be generated without problems associated with heat transfer through surfaces thus minimizing costs and equipment failures. High thermodynamic efficiencies can be obtained with supercritical steam since there is no stack heat loss.

Because a homogeneous single phase mixture of organics, oxidant and water is used, complete oxidation of the organics is facilitated and simplified reactors can be used. A simple tube, or fluidized bed can be used which contain no moving parts. Oxidation catalysts if used, can be those of common metal oxide or supported metal catalysts which provide sufficient activity for oxidation such as $Fe_3O_4$, $MnO_2$ and CuO, NiO, $Al_2O_3$, $Cu_3O_4$, Pt or Pt. In some cases, inorganic components of the feed which are normally present in water from artificial sources such as the sea or inorganic components of fossil fuels or wood products provide sufficient catalytic activity for rapid reactions. The oxidation process is so fast that the reactor often approaches adiabatic operation, that is, heat losses from the oxidizer ar negligible and the oxidizer effluent contains essentially all of the enthalpy of oxidation. Thus the outlet temperature of the oxidizer is determined by the concentration of the organics in the feed and their heating value.

In a first illustrative example, illustrating the invention and using the system of FIG. 1, the feed can be fuel oil having a heating value of 19,000 BTU/lb. with 8.7 pounds added to the feed slurry tank 11 along with 100 pounds of makeup water. This material is mixed and makeup water provided to a concentration of 5 to 20% by weight of the organic material with 8.7 weight % CH in one embodiment. The mixture is pressurized to a supercritical pressure above 3200 psia with 3600 psia in one embodiment and heated to a temperature in the vicinity of the critical temperature of water, e.g., 377° C. The preheating of FIG. 1 is accomplished by directly injecting a portion of the oxidizer effluent through line 31. In some cases, a heat exchanger can be used instead of direct injection of water to recycle heat derived from the flow coming from the oxidizer. In other cases, the feed material and makeup water can be heated although this is not preferred. Air or oxygen is pressurized and mixed with the pressurized fuel water mixture at 3600 psi with the proportion of oxygen adjusted to be equal to that required to completely oxidize the feed fuel, that is, at least stoichiometric. The temperature of the mixture of fuel, oxidant and water at the entrance to the oxidizer is above the kindling temperature required for the components of the fuel that are most readily oxidized. If no catalyst is used the kindling temperature can be as high as 350° to 400° C. but if catalysts are used the kindling temperature may be as low as 200° to 250° C.

The mixture of reactants is fed to the oxidizer 19 which can be a tubular reactor or fluidized bed. Low length-to-diameter (L-D) ratios in the fluidized bed are desired where the inorganic content is high so as to minimize the oxidizer reactor surface area and thereby minimize deposition of inorganics on the walls of the reactor. The reactor operates adiabatically and the heat released by oxidation of readily oxidized components is sufficient to raise the fluid phase to temperatures above the critical temperature of the mixture. At that point the fluid becomes a single, homogeneous phase. For 8.7 weight % of fuel oil in the feed, with air as the oxidant, the heat of oxidation is sufficient to raise the oxidizer outlet temperature to 565° C.

The effluent from the oxidizer is fed to the ash separator 25 where inorganics originally present in the feed and/or water are removed. The ash separator can be a cyclone, a settling column or any suitable solid-fluid separator.

A portion of the superheated supercritical water is recycled to the eductor 17 upstream of the supercritical oxidizer. This operation provides for sufficient heating of the feed to bring the oxidizer effluent to supercritical conditions. The remainder of the superheated supercritical water is available for power generation, heating or use as high pressure steam. A portion of available energy is used to generate the power required to pressurize feed and oxidant. The energy required to pressurize the oxidant is recovered in the expansion of the products of oxidation in the superheated supercritical water turbine. In this example, the temperature at the inlet of the oxidizer 19 is 377° C., 258 pounds of water are recycled through line 31 with the outlet in line 24 being at a temperature above the critical conditions of water and having a temperature of 565° C. for 106 pounds water, 29 pounds of carbon dioxide and 105 pounds of nitrogen.

This method of oxidation is analogous to that of a turbojet or gas turbine. The process illustrated does not require heat transfer through surfaces as in conventional fuel oil boilers. This is a major advantage resulting from the invention. In the conventional processes for generating supercritical steam, boiler feed water must be extremely pure to minimize deposition and buildup of inorganics on the water side of the boiler tubes. The direct oxidation of fuels or other organics in water avoids this problem completely and thus allows one to take full advantage of the high thermodynamic efficiency of generating power with supercritical steam. In fact it is possible to use impure water such as brine or seawater as feed because the inorganic salts are removed in the ash separator. The high temperature, high pressure steam produced by the process can thus be used as a source of desalinated water after condensation and removal of carbon dioxide and nitrogen if air is used as the oxidant.

In a second example using the system of FIG. 1, Douglas fir bark is processed in steps similar to those described above in the first example. The heating value of the Douglas fir bark (9,500 BTU/lb.) is considerably less that that of fuel oil. Therefore a higher weight fraction of feed (11.6 lbs. CH) 16.1 pounds bark to 100 pounds of water is required to reach the same oxidizer effluent temperature of 565° C. Since the recycle ratio is determined by the energy required to bring the feed to the desired oxidizer inlet temperature, an increase in feed concentration results in an increase in recycle ratio. Thus 298 pounds of oxidizer effluent per 100 pounds of water feed must be recycled with bark feed whereas about 259 pounds is recycled when fuel oil is the feed.

In the second example, the temperature in line 27 is 565° C., 100 pounds of water in the line contains 39.2 pounds of carbon dioxide and 141 pounds of nitrogen. The inlet temperature to the oxidizer is 377° C. and the operating pressure is 3600 psia when 11.6 pounds CH that is 16.1 pounds bark of Douglas fir (9,500 BTU/lbs.) is used with oxygen. Bark and the like when used in this invention is comminuted into particles preferably having a size of about ¼ mm or less.

The process illustrated in FIG. 1 when used for generating high pressure stream from forest product wastes has several advantages over conventional processes that are used for the same purpose. Drying of feed is unnecessary because water is used as the carrier fluid for oxidation. Oxidation is effected rapidly and yet under safe controlled conditions. Auxiliary equipment for pollution control is not necessary because the oxidation products are maintained within the system.

In a third example a reformer (not shown) is put in the line 18 and comprises merely a tube which permits reforming of coal used as the feed. In this example 10 pounds CH of coal having a heating value of 13–14,000 BTU/lb. is admixed with 100 pounds of water, recycling 275 pounds of water from the oxidizer line 27 through the reformer. The entrance temperature to the oxidizer is 377° C. and the exit temperature is 565° C. with a mixture of 107 pounds water, 33 pounds $CO_2$ and 121 nitrogen when air is used as the oxidizing agent. The operating pressure of the system is 3,600 psi. The reformer provides sufficient residence time in an oxidant-free environment to allow a significant portion of the solid fuel to be solubilized. As described in U.S. Pat. No. 4,113,446 solids such as wood, coal and the like can be dissolved to an appreciable extent in water under supercritical conditions. Where such solids are to be subsequently oxidized, it may be advantageous to first dissolve them in the supercritical water phase. The effect of reforming may provide for a significantly lower kindling temperature in the oxidizer. Where the oxidation is solid catalyzed, this solution prior to catalytic oxidation can also facilitate mass transfer of fuel to the surface of the solid catalyst thereby enhancing the oxidation rate. However, in many cases, no distinct reforming step is required and the materials are solubilized in passage to the oxidizer.

In a further example showing the oxidation of sewerage sludge, a system as shown in FIG. 1 is used using sewerage sludge having a BTU output of 2,000 BTU/lb. 13.3 pounds CH (81.6 pounds sludge) is used with 100 pounds of makeup water operating at a pressure of 3600 psi with a recycle of 169.4 pounds water from the oxidizer and an input temperature of 377° C. to the oxidizer. When oxygen is used as the oxidant, the temperature at the oxidizer outlet is 1050° F. with 109.3 pounds of water and 44.9 pounds of $CO_2$ in line 27. This system can also be used with toxic and hazardous chemicals in low amounts as in wastes, feed lot wastes, agricultural by-products, textile wastes, carpet wastes, rubber by-products, forest product wastes, paper and pulp mill wastes and the like.

Disposal by oxidation of sewerage sludge waste is representative of one of the more difficult wastes in the sense that the heating value of the sludge typically runs around 2,000 BTU/lb. of sludge. A process for oxidizing sewerage sludge as described differs from those described previously in that the oxidant is preferably relatively pure oxygen (98%). The high percentage of oxygen enables relatively lower sludge feed concentrations than if air were used.

Figure 1A:
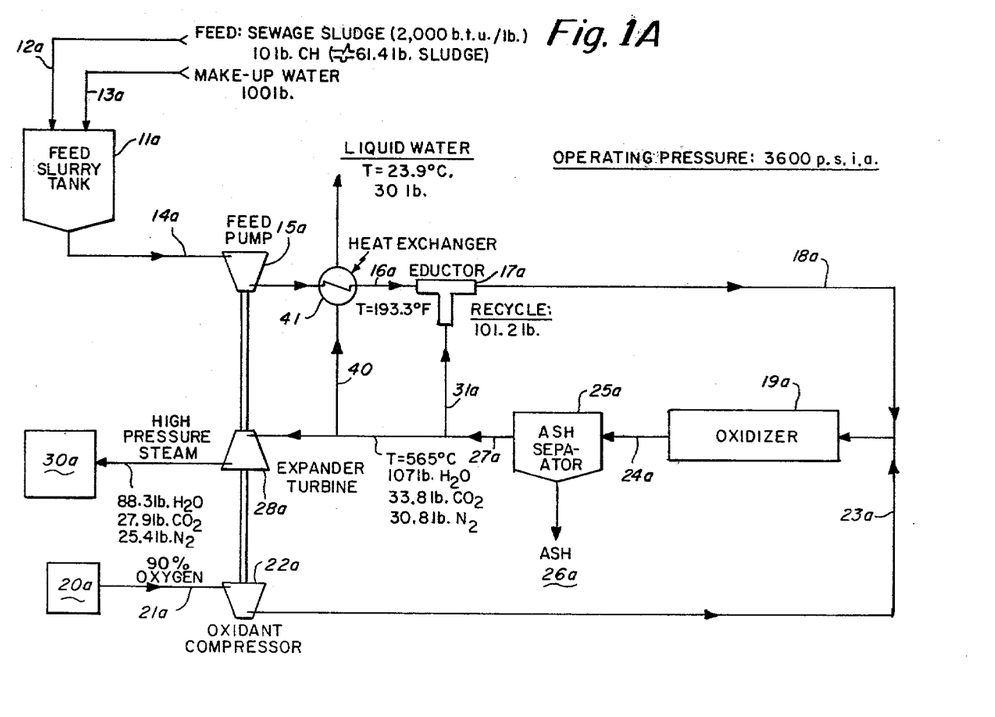
FIG. 1A is a schematic diagram of an alternate embodiment thereof.

In another example, sewerage sludge in an amount of 10 pounds CH (61.4 pounds sludge) is mixed with 100 pounds of water in a system substantially as set up with respect to FIG. 1. This example is diagrammatically illustrated in FIG. 1A where all numbered parts marked "a" are identical to corresponding numbered parts of FIG. 1. Water in an amount of 30 pounds at a temperature of 24° C. is removed from a heat exchanger 41 which receives water in the near critical region through line 40. The preheating of water in line 16a is necessary to get enough heat at the entrance to the oxidizer so that the entrance value is 377° C. thereby allowing single phase operation of the oxidizer. Line 27a has a temperature of 549° C. with 107 pounds water 33.8 pounds $CO_2$ and 30.8 pounds $N_2$ passing through the turbine after the recycle extraction to give 88.3 pounds of water 27.9 pounds $CO_2$ and 25.4 pounds $N_2$. Ninety percent oxygen is used. Thus a feed of 61 pounds sludge and 100 pounds water is preheated to 193° C. by passing 30 pounds of oxidizer effluent to the heat exchanger. The effect of indirect preheat of the feed is similar to that of increasing feed heating value or concentration. The recycle ratio necessary to reach a given oxidizer inlet temperature is decreased. At the same time, the oxidizer outlet temperature is increased because the heat of oxidation is taken up by a smaller quantity of fluid passing through the reactor.

The specific oxidizer inlet and outlet temperatures can vary as for example depending on whether oxygen or air is used in the reaction mixture, see FIG. 2.

Figure 3:
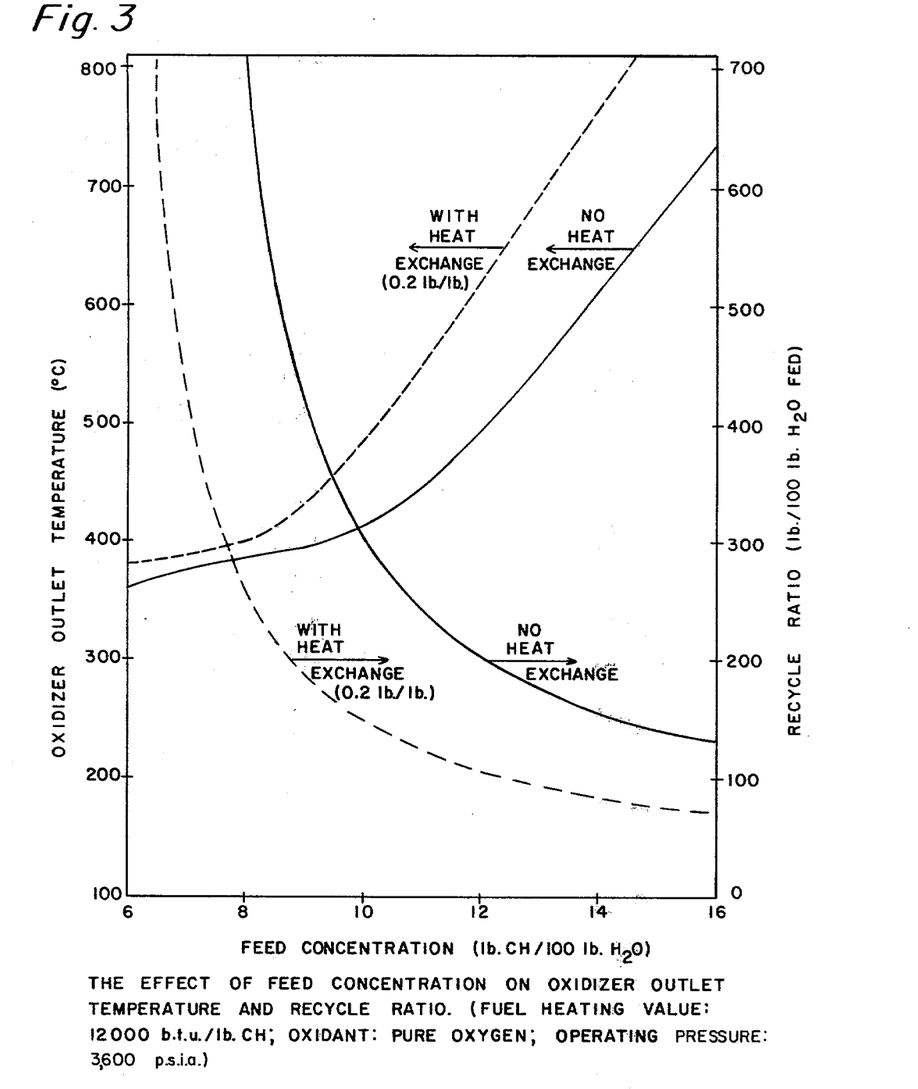
FIG. 3 is a diagrammatic showing of the effect of feed concentration on oxidizer outlet temperature and recycle ratios.

FIG. 3 shows the effect of feed preheat with a heat exchanger 41 or without it. For a feed with 12,000 BTU/lb. heating value and pure oxygen and operating pressure of 3,600 psia the oxidizer outlet temperature and recycle ratio are shown as a function of feed concentration in solid curves. Superimposed on this figure are the corresponding values (dashed curves) when 20 pounds of oxidizer effluent (per 100 pounds of feed water) are used to preheat the feed through the heat exchanger. Higher degrees of preheat (i.e., larger proportions of oxidizder effluent to the exchanger) would lead to further increases in oxidizer outlet temperature and lower recycle ratios.

While specific examples of this invention have been shown and described, many variations are possible. The reactor can have various configurations such as tubes, cylinders or fluidized beds of austenitic steel. When corrosive components such as chlorides are present, the tubular reactors preferably are clad with corrosion-resistant alloys such as Hastelloy C. Various compressors, eductors and the like can be used.

The power output can be effected using turbines commonly manufactured for expansion of supercritical water in supercritical power cycles.

A key feature is that a single fluid phase reaction occurs in the oxidizer at supercritical conditions of the reaction mixture and preferably at the near critical condition of water. In some cases, the oxidation can start at a temperature below the critical temperature of water as at the kindling temperature of the organic material. In all cases the starting mixture and subsequent products are considered the reaction mixture. At some point in the reaction in the oxidizer the mixture reaches the supercritical condition and preferably the near critical condition of water and a temperature of at least 374° C. to give a single phase reaction enabling essentially complete oxidation by a stoichiometric amount of oxygen. The pressure used in the continuous system of this invention is preferably always in the near critical region of water and thus always at least 220 atmospheres.

Although only a single organic material has been specifically noted in each example, it should be understood that the feed material can be a mixture of organics. In some cases, the mixture of organics can be unknown or undetermined as to its exact makeup. It is only important that a sufficient concentration of organics having the required heating value be used so that when reacted with stoichiometric amounts of oxygen, the effluent stream will have a temperature such as to produce some aid in providing the heat required for bringing the feed to appropriate conditions for the oxidizing reaction. It is an important feature of the invention that the heat produced by the oxidation can be used at least in part in a portion of an effluent stream to recycle directly with the reaction mixture to provide heat thereto and/or to be passed to a heat exchanger to provide heat to the reaction mixture through a heat exchange surface. When a portion of the effluent stream from the flow through oxidizer is recycled directly into the stream as at 17 substantially instantaneous heat transfer occurs. Simple eductors and other nonmechanical agitator mixing means and methods can be used. In some cases the water and oxidation product stream from the oxidizer is used entirely as a power or heat source.

The term "single homogeneous fluid phase" as used herein has its ordinary known meaning with respect to the mixture of fluids present where the mixture is at uniform pressure, temperature, density and concentration. There is some change in all parameters except pressure in the reactor or oxidizer, however, at any cross section all parameters are substantially uniform in the single homogeneous fluid phase. Thus it is important that there is at least one portion of the reaction mixture in the oxidizer where there is no dispersion of one fluid in another.

What is claimed is:

1. A method of obtaining useful energy and oxidizing organic materials in an oxidizer, said method comprising forming a reaction mixture of said organic material, water and oxygen,
and reacting said mixture in a single homogeneous fluid phase under conditions characterized by a temperature of at least 377° C. and a pressure of at least 220 atmospheres to cause said organic materials to be oxidized thereby raising the temperature of said water and oxidiation products.

2. The method of claim 1 wherein at least a portion of the effluent from said oxidation region is connected with a power generating device.

3. A method of treating an organic material containing waste by an oxidation process, said process comprising obtaining a mixture of said waste with water, said water acting as a carrier fluid and admixing oxygen therewith to form a reaction mixture in a continuous flow and substantially completely oxidizing said organic material in a flow through reactor wherein said reaction occurs with said mixture as a single homogeneous fluid phase under conditions characterized by a temperature of at least 377° C. and a pressure of at least 220 atmospheres.

4. A method of removing inorganic salts from water, said method comprising admixing an organic material with said water carrying an inorganic salt and oxygen to form a reaction mixture, wherein said organic material comprises from 2 to 25% by weight of said water forming a single fluid phase of said reaction mixture under conditions characterized by a temperature of at least 377° C. and a pressure of at least 220 atmospheres and oxidizing said organic material to obtain a temperature of at least 450° C. in an effluent stream,
and removing said inorganic salts as particulates from a stream of reactants with the aid of the temperature elevated above 450° C. to reduce the solubility of said inorganic salts.

5. The process of claim 4 wherein said inorganic salts are soluble in water below the supercritical conditions for water.

6. The method of reacting an organic material which comprises
mixing said organic material with water and a fluid comprising oxygen to form a mixture,
causing said mixture to undergo reaction in a single substantially homogeneous fluid phase under conditions characterized by a temperature of at least 377° C. and a pressure of at least 220 atmospheres.

7. The method of claim 6 which includes the steps of:
carrying out said mixing step at a pressure supercritical for said water; and
introducing said mixture into a flow reactor.

8. The method of claim 6 in which said organic material is at least one-half percent of said mixture.

9. The method of claim 6 in which said water is at least forty percent of said mixture.

10. The method of claim 6 in which said reaction requires no more than five minutes.

11. The method of claim 6 in which said mixture includes an inorganic salt; and
said mixture is subjected to temperature sufficiently high to render insoluble said inorganic salt.

12. The method of claim 11 in which said mixture is brine and a result of said reaction is desalination of said brine.

13. The method of claim 6 which additionally includes the step of removing useful power generated by said reaction.

14. The method of claim 6 in which an undesirable organic material is changed in chemical composition in said reaction.

15. The method of claim 6 in which heat produced in said reaction is reintroduced into said reaction.

16. The method of claim 15 wherein the reintroduction of heat produced in said reaction provides the total heat energy to maintain said reaction.

17. The method of claim 15 in which a portion of effluent from said reaction is added to said mixture.

18. The method of oxidizing an organic material, which comprises the steps of forming a reaction mixture comprising the organic material, water and an oxygen-containing gas and flowing such reaction mixture through an oxidation region; causing the reaction mixture to be brought to an oxidation temperature which is at least 377° C. at a pressure of at least 220 atmospheres and which would establish for the water in the oxidation region a supercritical density which is less than about 0.7 gm/cm$^3$, and controlling the ratio of oxygen and organic material in the reaction mixture and the rate of flow thereof through the oxidation region so as to oxidize the organic material within the oxidation region.

19. The method of claim 6 or 18 in which said organic material is first mixed with said water to form a preliminary mixture; and
said preliminary mixture is then mixed with said fluid comprising oxygen to form said mixture.

20. The method as defined in claim 18 wherein the mean temperature of the oxidation region is at least 400° C. whereby the residence time for substantially complete oxidation is less than 5 minutes.

21. A method in accordance with the method of claim 18 wherein said organic materials are selected from the class consisting of fuels, toxic materials and waste materials, and aqueous slurries or solutions thereof.

22. The method of claim 18 wherein the effluent from the oxidation region reaches a temperature of at least 450° C., and inorganic salts are precipitated from the effluent.

23. The method of claim 18 wherein at least a portion of the effluent from the oxidation region is recycled to preheat the water entering the oxidation region.

24. The method of claim 18 wherein the effluent from the oxidation region is used to provide heat to raise the temperature and energy to raise the pressure of the reaction mixture.

25. The process of claim 18 wherein the kindling temperature for the organic material is reached prior to said oxidation region.

26. The process of claim 18 wherein the concentration of organic material is sufficient to provide the required heating value so that when reacted with stoichiometric amounts of oxygen the effluent stream will have a temperature which is adequate to provide a useful energy source.

27. The method of claim 18 wherein the effluent from the oxidation region is passed through a heat exchanger and/or added directly to said mixture to provide heat to said reaction.

28. The process of claim 18 which comprises supplying heat and pressure to said reaction mixture to provide a selected reaction pressure and a selected initial temperature in which the selected initial temperature is at least the kindling temperature of the reaction mixture and the selected reaction pressure is at least the critical pressure of water and recycling at least a portion of the supercritical effluent from the oxidation region.

29. The process of claim 18 wherein the heat value of said organic material is adequate to provide a temperature of at least 450° C. in said oxidation region.

* * * * *

UNITED STATES PATENT AND TRADEMARK OFFICE
CERTIFICATE OF CORRECTION

PATENT NO. : 4,338,199
DATED : July 6, 1982
INVENTOR(S) : Michael Modell

It is certified that error appears in the above—identified patent and that said Letters Patent is hereby corrected as shown below:

Column 9, line 3, after "$Cu_3O_4$" insert --AgO--.

Column 9, line 10, change "ar" to --are--.

Column 12, line 18, change "oxidzder" to --oxidizer--.

Column 13, line 26, change "oxidiation" to --oxidation--.

Signed and Sealed this

Seventh Day of September 1982

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : BI 4,338,199

DATED : November 22, 1988

INVENTOR(S) : Michael Modell

It is certified that error appears in the above-identified patent and that said Letters Patent is hereby corrected as shown below:

On the title page, Item [45] "Nov. 15, 1988" should read

-- Nov. 22, 1988 --.

Signed and Sealed this

Sixth Day of December, 1988

Attest:

DONALD J. QUIGG

Attesting Officer

Commissioner of Patents and Trademarks

REEXAMINATION CERTIFICATE (948th)
United States Patent
[11] B1 4,338,199

Modell

[45] Certificate Issued Nov. 15, 1988

[54] PROCESSING METHODS FOR THE OXIDATION OF ORGANICS IN SUPERCRITICAL WATER

[75] Inventor: Michael Modell, Cambridge, Mass.

[73] Assignee: Modar, Inc., Natick, Mass.

Reexamination Request:
No. 90/001,378, Nov. 16, 1987

Reexamination Certificate for:
Patent No.: 4,338,199
Issued: Jul. 6, 1982
Appl. No.: 147,946
Filed: May 8, 1980

Certificate of Correction issued Jul. 28, 1982.

[51] Int. Cl.$^4$ .................................... C02F 1/72
[52] U.S. Cl. .................................... 210/721; 210/761

[56] References Cited

U.S. PATENT DOCUMENTS

| | | | |
|---|---|---|---|
| 2,735,265 | 2/1956 | Eastman | 60/39.05 |
| 2,944,396 | 7/1960 | Barton | 210/763 X |
| 3,626,874 | 12/1971 | Grant | 110/222 |
| 3,804,756 | 4/1974 | Callahan et al. | 210/763 |
| 3,876,536 | 4/1975 | Pradt et al. | 210/758 X |
| 3,977,966 | 8/1976 | Pradt et al. | 210/616 |
| 3,984,311 | 10/1976 | Diesen et al. | 210/763 X |
| 4,010,098 | 3/1977 | Fassell | 210/758 X |
| 4,061,566 | 12/1977 | Modell | 210/673 |
| 4,100,730 | 7/1978 | Pradt | 210/761 X |
| 4,145,283 | 3/1979 | Topp et al. | 210/761 |
| 4,174,280 | 11/1979 | Pradt et al. | 210/758 |
| 4,191,012 | 3/1980 | Stoddard et al. | 210/761 X |
| 4,212,735 | 7/1980 | Miller | 210/763 |
| 4,292,953 | 10/1981 | Dickinson | 126/263 |

FOREIGN PATENT DOCUMENTS

584671 9/1947 United Kingdom.

*Primary Examiner*—Thomas G. Wyse

[57] ABSTRACT

Organic materials are oxidized in supercritical water to obtain useful energy and/or resultant materials. In one embodiment, conventional fuels are oxidized with high efficiency to obtain useful energy for power generation and/or process heat. In another embodiment toxic or waste materials are converted to useful energy for power and heat and/or to non-toxic resultant materials. The method is also useful to permit use of a wide range of organic materials as a fuel in the desalination of seawater and brine or the removal of certain inorganic salts from water.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5 and 10 are cancelled.

Claims 1–4, 6, 8, 11, 13–15, 18, 20, 22, 25 and 27 are determined to be patentable as amended.

Claims 7, 9, 12, 16, 17, 19, 21, 23, 24, 26, 28 and 29, dependent on an amended claim, are determined to be patentable.

New claims 30–36 are added and determined to be patentable.

1. A method of obtaining useful energy and oxidizing organic materials in an oxidizer, said method comprising forming a reaction mixture of said organic material, water and oxygen, and reacting said mixture in a single homogeneous fluid phase under conditions characterized by a temperature of at least 377° C. and a pressure of at least 220 atmospheres to cause said organic materials to be oxidized *within a period of less than about 5 minutes* thereby raising the temperature of said water and oxidation products.

2. The method of claim 1 *or 30 or 31 or 32 or 33* wherein at least a portion of the effluent from said oxidation region is connected with a power generating device.

3. A method of treating an organic material containing waste by an oxidation process, said process comprising water acting as a carrier fluid and admixing oxygen therewith to form a reaction mixture in a continuous flow and substantially completely oxidizing said organic material in a flow through reactor wherein said reaction occurs with said mixture as a single homogeneous fluid phase under conditions characterized by a *temperature of at least 377° C. and a pressure of at least 220 atmospheres* [.] *within a period of less than about 5 minutes.*

4. A method of removing inorganic salts from water, said method comprising admixing an organic material with said water carrying an inorganic salt and oxygen to form a reaction mixture, [wherein said organic material comprises from 2 to 25% by weight of said water] forming a single fluid phase of said reaction mixture under conditions characterized by a temperature of at least 377° C. and a pressure of at least 220 atmospheres and oxidizing said organic material to obtain a temperature of at least 450° C. in an effluent stream, and removing said inorganic salts as particulates from a stream of reactants with the aid of the temperature elevated above 450° C. to reduce the solubility of said inorganic salts [.] , *including those which are otherwise highly soluble in water below supercritical conditions for water.*

6. The method of reacting an organic material which comprises mixing said organic material with water and a fluid comprising oxygen to form a mixture, causing said mixture to undergo reaction in a single substantially homogeneous fluid phase under conditions characterized by a temperature of at least 377° C. and a pressure of at least 220 atmospheres [.] *in which said reaction requires no more than about 5 minutes.*

8. The method of claim 6 *or 32* in which said organic material is at least one-half percent of said mixture.

11. The method of claim 6 *or 30 or 31 or 33* in which said mixture includes an inorganic salt; and said mixture is subjected to temperature sufficiently high to render insoluble said inorganic salt.

13. The method of claim 6 *or 30 or 31 or 32 or 33* which additionally includes the step of removing useful power generated by said reaction.

14. The method of claim 6 *or 30 or 31 or 32 or 33* in which an undesirable organic material is changed in chemical composition in said reaction.

15. The method of claim 6 *or 18 or 30 or 31 or 32 or 33* in which heat produced in said reaction is reintroduced into said reaction.

18. The method of oxidizing an organic material, which comprises the steps of forming a reaction mixture comprising the organic material, water and an oxygen-containing gas and flowing such reaction mixture through an oxidation region; causing the reaction mixture to be brought to an oxidation temperature which is at least 377° C. at a pressure of at least 220 atmospheres and which would establish for the water in the oxidation region a supercritical density which is less than about 0.7 gm/cm$^3$, and controlling the ratio of oxygen and organic material in the reaction mixture and the rate of flow thereof through the oxidation region so as to oxidize the organic material within the oxidation region [.] *in a residence time of less than about 5 minutes.*

20. The method as defined in claim 18 wherein the mean temperature of the oxidation region is at least 400° C. [whereby the residence time for substantially complete oxidation is less than 5 minutes.].

22. The method of claim 6 *or 18 or 30 or 31 or 33* wherein the effluent from the oxidation region reaches a temperature of at least 450° C., and inorganic salts are precipitated from the effluent.

25. The process of claim 18 *or 32* wherein the kindling temperature for the organic material is reached prior to said oxidation region.

27. The method of claim 6 *or 18 or 30 or 31 or 32 or 33* wherein the [effluent] *fluid* from the oxidation region is passed through a heat exchanger and/or [added directly to] *mixed directly with* said mixture to provide heat to said reaction.

*30. The method of reacting an organic material in an oxidizer which comprises:*

*mixing said organic material with water and a fluid comprising oxygen to form a mixture,*

*causing said mixture to undergo reaction at the inlet of said oxidizer under supercritical conditions characterized by a temperature in the vicinity of the critical temperature of water and a pressure of at least about 3200 psia.*

*31. The method of reacting an organic material in an oxidizer which comprises:* mixing said organic material with water and a fluid comprising oxygen to form a mixture, causing said mixture to undergo reaction at the inlet of said oxidizer under supercritical conditions characterized by a temperature of at least about 377° C. of water and a pressure of at least about 3200 psia.

32. The method of reacting an organic material, comprising:

mixing said organic material with water and a fluid comprising oxygen to form a mixture wherein said mixture is a brine; and causing said mixture to undergo reaction under conditions characterized by a temperature of about 377° C. and a pressure of about 220 atmospheres in which a result of said reaction is desalination of said brine.

33. The method of reacting an organic material having a tendency to char comprising:

mixing said organic material with water and a fluid comprising oxygen;

heating said mixture rapidly to a temperature above the char formation temperature for the organic material;

causing said mixture to undergo reaction under supercritical conditions characterized by a temperature of at least 377° C. and a pressure of at least 220 atmospheres.

34. The method set forth in claim 33, comprising:

said organic material is cellulosic;

said reaction under supercritical conditions takes place in an oxidizer; and said organic material enters the oxidizer at a temperature of at least about 350° C. and a pressure of at least about 220 atmospheres.

35. The method of claim 15 in which reactor fluid at supercritical conditions is mixed directly with the mixture incoming to the reactor.

36. The method set forth in claim 1 or 3 or 4 or 6 or 18 or 30 or 31 wherein said reactor mixture, prior to said reacting or reaction, is at a temperature in the vicinity of the critical temperature of water and a pressure of at least 3200 psia.

* * * * *